(12) United States Patent
Gross

(10) Patent No.: US 7,412,892 B1
(45) Date of Patent: Aug. 19, 2008

(54) METHOD OF MAKING PRESSURE TRANSDUCER AND APPARATUS

(75) Inventor: Chris Gross, Yorktown, VA (US)

(73) Assignee: Measurement Specialties, Inc., Hampton, VA (US)

( * ) Notice: Subject to any disclaimer, the term of this patent is extended or adjusted under 35 U.S.C. 154(b) by 0 days.

(21) Appl. No.: 11/810,606

(22) Filed: Jun. 6, 2007

(51) Int. Cl.
*G01L 9/04* (2006.01)

(52) U.S. Cl. .................. 73/720; 73/726; 361/283.1; 438/53

(58) Field of Classification Search .............. 73/720, 73/726
See application file for complete search history.

(56) References Cited

U.S. PATENT DOCUMENTS

| | | |
|---|---|---|
| 3,798,754 A | 3/1974 | Price et al. |
| 3,848,329 A | 11/1974 | Igarashi et al. |
| 3,849,874 A | 11/1974 | Jeffers |
| 3,912,563 A | 10/1975 | Tomioka et al. |
| 4,188,258 A | 2/1980 | Mounteer et al. |
| 4,603,371 A * | 7/1986 | Frick ................. 361/283.3 |
| 4,951,236 A | 8/1990 | Kawate et al. |
| 4,982,351 A | 1/1991 | Kawate et al. |
| 5,051,937 A | 9/1991 | Kawate et al. |
| 5,286,671 A | 2/1994 | Kurtz et al. |
| 5,317,921 A * | 6/1994 | Kremidas ................. 73/721 |
| 5,518,951 A | 5/1996 | Paynter et al. |
| 5,616,523 A | 4/1997 | Benz et al. |
| 5,622,901 A | 4/1997 | Fukada |
| 5,869,876 A | 2/1999 | Ishio et al. |
| 5,880,509 A | 3/1999 | Watanabe et al. |
| 5,912,499 A | 6/1999 | Diem et al. |
| 6,001,666 A | 12/1999 | Diem et al. |
| 6,143,584 A | 11/2000 | Fukada et al. |
| 6,197,610 B1 | 3/2001 | Toda |
| 6,228,275 B1 | 5/2001 | Koch et al. |
| 6,232,140 B1 | 5/2001 | Ferrari et al. |
| 6,319,743 B1 | 11/2001 | Marchant et al. |
| 6,417,021 B1 | 7/2002 | Vigna et al. |
| 6,427,539 B1 * | 8/2002 | Chen et al. ................ 73/726 |
| 6,441,451 B1 | 8/2002 | Ikeda et al. |
| 6,472,244 B1 * | 10/2002 | Ferrari et al. ............... 438/53 |
| 6,552,404 B1 | 4/2003 | Hynes et al. |
| 6,620,644 B2 | 9/2003 | Kretschmann et al. |
| 6,635,910 B1 | 10/2003 | Gross |
| 6,653,702 B2 | 11/2003 | Ishio et al. |
| 6,686,634 B2 | 2/2004 | Ishio |
| 6,756,248 B2 | 6/2004 | Ikeda et al. |
| 6,770,505 B1 | 8/2004 | Chiesl |
| 6,838,303 B2 | 1/2005 | Wang et al. |
| 6,865,951 B2 | 3/2005 | Katsumata et al. |
| 6,881,648 B2 * | 4/2005 | Chen et al. ................ 438/459 |
| 6,887,734 B2 | 5/2005 | Katsumata et al. |
| 7,074,634 B2 | 7/2006 | Foglietti et al. |
| 7,081,647 B2 | 7/2006 | Mushika |
| 7,083,737 B2 | 8/2006 | Lee et al. |
| 7,087,450 B2 | 8/2006 | Choi et al. |
| 7,094,620 B2 | 8/2006 | Okumura et al. |
| 7,115,482 B2 | 10/2006 | Maki et al. |

* cited by examiner

*Primary Examiner*—Andre J Allen
(74) *Attorney, Agent, or Firm*—Howard IP Law Group PC

(57) ABSTRACT

A method for making a pressure transducer comprising: forming a recess in a diaphragm, the diaphragm having a thinned region that deflects responsively to pressure being applied thereto; depositing a glass frit in the recess; embedding a plurality of strain gages in the glass frit; and, wire bonding the strain gages into a Wheatstone bridge configuration.

18 Claims, 6 Drawing Sheets

SINGLE BRIDGE
SEMICONDUCTOR
STRAIN GAGE

HALF BRIDGE
SEMICONDUCTOR
STRAIN GAGE

US 7,412,892 B1

METHOD OF MAKING PRESSURE TRANSDUCER AND APPARATUS

FIELD OF THE INVENTION

The present invention relates generally to pressure sensors, and more particularly to strain gage based pressure transducers.

BACKGROUND OF THE INVENTION

Strain gage based pressure transducers are used to measure pressures, such as the pressure of fluids in a vehicle. A strain gage based pressure transducer that utilizes an integrated Wheatstone bridge exhibits a high over pressure capability, high output, low zero offset and linear output.

Conventional pressure transducers typically utilize four stain gages bonded to the diaphragm of a metal pressure port. As is well known in the art, the gages are positioned on the diaphragm in such a way that two strain gages are put into compression and two strain gages are put into tension when pressure is applied to the diaphragm.

Currently, the process for producing a pressure transducer on a machined metal pressure port having a thin diaphragm on the top surface is to first bead/sand blast the top surface of the pressure port to roughen the surface in order to keep the glass from flowing out and becoming too thin. The pressure port is put through a cleaning cycle to remove any particles from the port that may result from the bead/sand blasting. The glass frit is then screened printed at two separate locations on the top surface of the pressure port. The pressure port is passed through a furnace to fire the glass frit. Two half bridge strain gages are then placed on top of the fired glass fit. The pressure port is again passed through a furnace to embed the strain gages into the glass. Six wire bonds are made between the strain gages and an interface printed circuit board (PCB) to form a Wheatstone bridge circuit.

The aforementioned process results in puddling of the glass frit on the diaphragm, non-uniform glass thickness and concomitant breakdown voltage control problems, dirt and debris resulting from the bead blasting process, and other processing inefficiencies and drawbacks. Alternative apparatus and methods for forming a pressure transducer are desired.

SUMMARY OF THE INVENTION

A method for making a pressure transducer comprising: forming a recess in a diaphragm, the diaphragm having a thinned region that deflects responsively to pressure being applied thereto; depositing a glass frit in the recess; embedding a plurality of strain gages in the glass frit; and, wire bonding the strain gages into a Wheatstone bridge configuration.

A pressure transducer including: a diaphragm having a thinned region; a recess in the diaphragm; a glass frit in the recess; and, a plurality of strain gages in the glass frit; wherein, when a pressure is applied to the diaphragm, the thinned region deflects responsively thereto.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE INVENTION

Figure 1A:
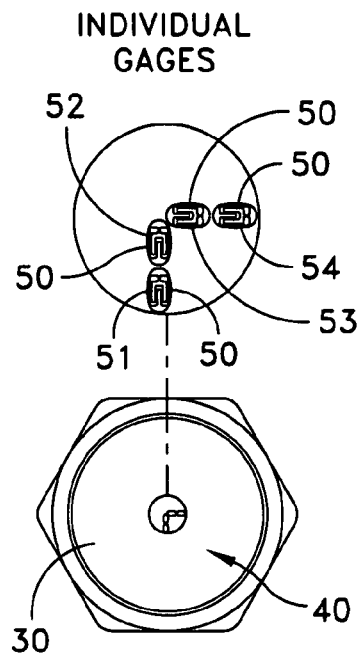
FIG. 1A illustrates a schematic top view of strain gages configured on a glass frit applied to a surface of a diaphragm of a pressure transducer according to the prior art.

It is to be understood that the figures and descriptions of the present invention have been simplified to illustrate elements that are relevant for a clear understanding of the present invention, while eliminating, for purposes of clarity, many other elements found in typical strain gage based pressure transducers and methods for making the same. However, because such elements are well known in the art, and because they do not facilitate a better understanding of the present invention, a discussion of such elements is not provided herein. The disclosure herein is directed to all such variations and modifications known to those skilled in the art.

Before embarking on a detailed discussion of the present invention, the following should be understood. Prior Art FIGS. 1A through 1E show various views of single and half bridge semiconductor strain gages useful for implementation as a pressure transducer. In the prior art, a typical pressure transducer 10 (see FIG. 1C) includes four (4) strain gages 51, 52, 53, 54 (see FIG. 1A, 1B) bonded to a thinned region 40 of a diaphragm 30, of pressure port 20. A puddle or area 50 of glass is deposited onto the top surface of the diaphragm which diaphragm is first bead blasted to roughen the area where the glass frit is to be deposited. The gages are formed within glass frit 50 as shown for example, in FIGS. 1A-1B.

Figure 1B:
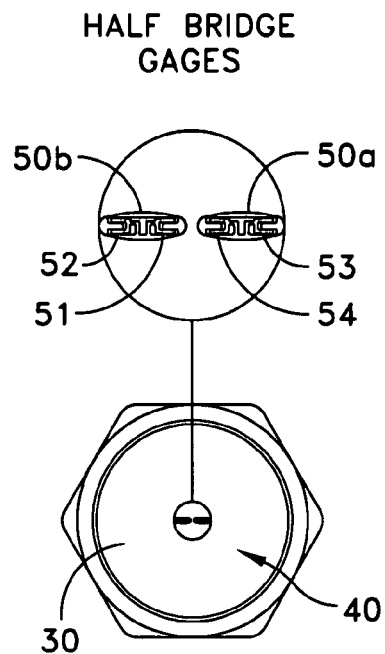
FIG. 1B illustrates a schematic top view of half bridge strain gages configured on a glass frit applied to a surface of a diaphragm of a pressure transducer according to the prior art.
Figure 1C:
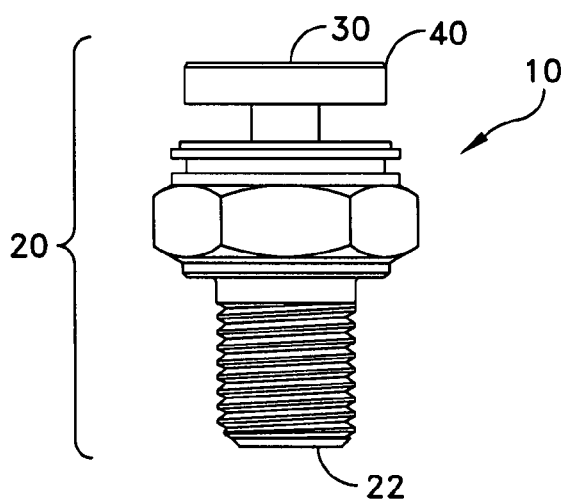
FIG. 1C illustrates a schematic side view of a pressure transducer of FIG. 1 or FIG. 2.
Figure 1D:
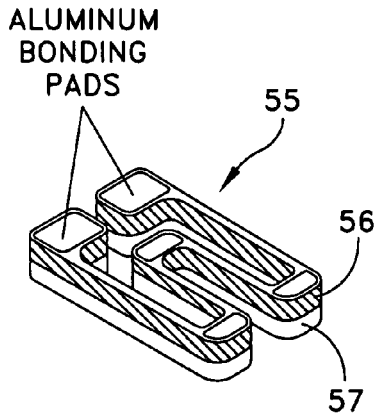
FIG. 1D illustrates a perspective view of a single bridge strain-gage suitable for use with the transducer of FIGS. 1A and 1B.
Figure 1E:
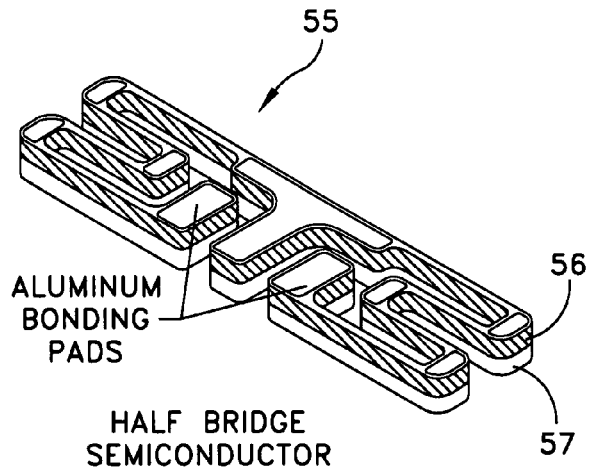
FIG. 1E illustrates a perspective view of a half bridge strain-gage suitable for use with the transducer of FIGS. 1A and 1B.
Figure 1F:
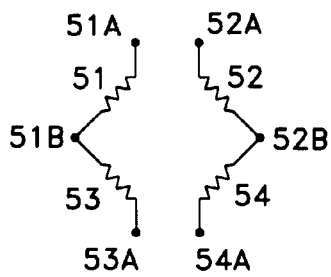
FIGS. 1F and 1G illustrate electrical representations of transducer strain gage bridge configurations.
Figure 1G:
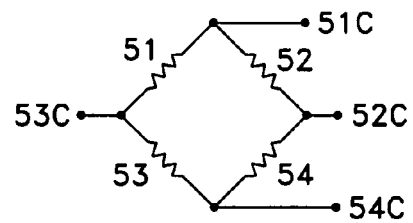
Figure 1H:
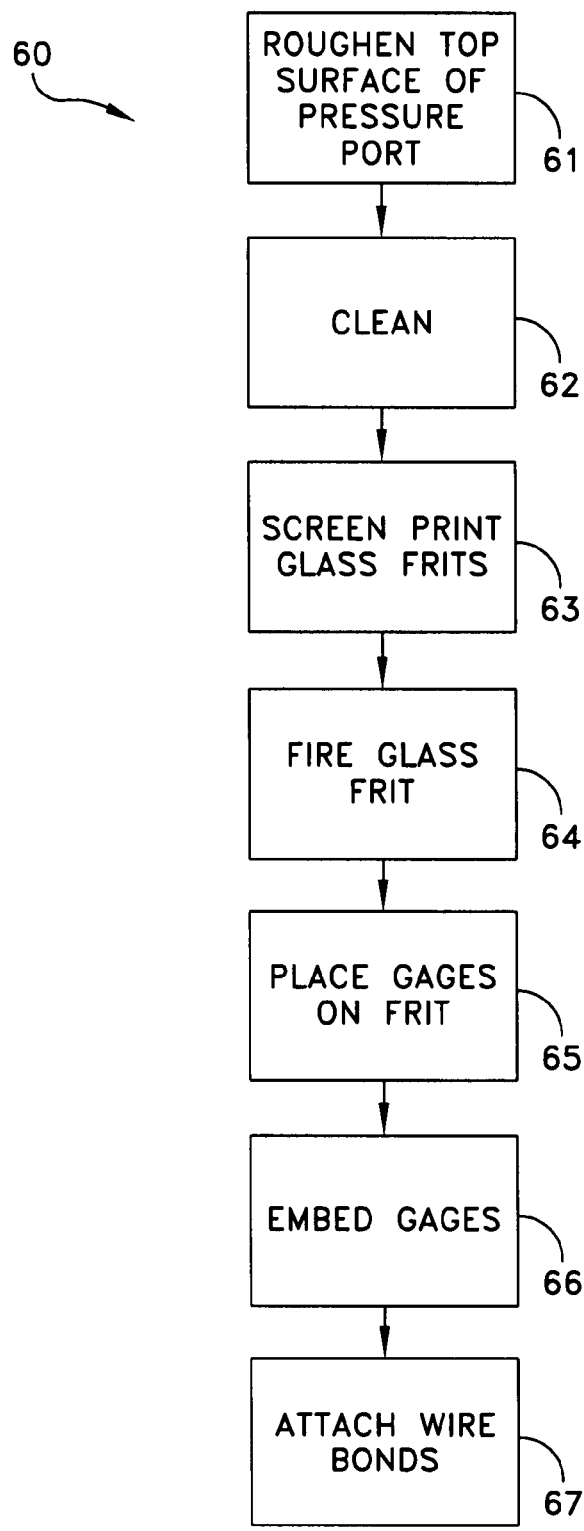
FIG. 1H illustrates a flow diagram of a process suitable for securing four (4) pressure strain gages of to the diaphragm of the transducer of FIG. 1A or 1B according to the prior art.

The prior art process of forming such gages on diaphragm 30 is illustrated with respect to FIG. 1H. As previously mentioned the top surface of diaphragm 30 is first bead blasted to roughen the areas where the glass frit is to be deposited (block 61) to facilitate glass flow across the diaphragm prior to firing. The diaphragm 30 is then cleaned (block 62) to remove residue from the bead blasting. The glass frit (e.g. 50a, 50b of FIG. 1B) is then screen printed at the locations where the gages are to be positioned (block 63). The glass frit is fired (block 64) and semiconductor strain gages are then configured (e.g. in a Wheatstone half bridge configuration of two serpentine gages as shown in FIG. 1B) and placed on top of each fired frit (50a, 50b). The composite frits and gages are fired (block 65) so as to embed the gages into the frits. Wire bonds (e.g., 51A, 51B, 53A, 52A, 52B, 54A of FIG. 1F or 51C, 52C, 53C, 54C of FIG. 1G) are attached to an interface, such as an Application Specific Integrated Circuit (ASIC), to complete the Wheatstone bridge configuration.

As is understood by one of ordinary skill in the art, a strain gage suitable for use as strain gages 51, 52, 53, 54 (of FIG. 1C) may include a serpentine strain gage 55 as shown in prior art FIGS. 1D, 1E and can be a single gage or two gages connected as a half bridge. It is understood, however, that such serpentine strain gage configuration is not necessary, and other such semiconductor strain gages may be used to form the transducer according to the present invention. In any event, for the serpentine strain gage illustrated, each strain gage is a piezoresistive device that utilizes a force to cause a resistance change due to mechanical strain. Strain gage 55 has a thin layer 56 of highly electrically-conductive (highly conductive) silicon of a desired conductivity type supported by a relatively highly electrical-resistive (highly resistive) host substrate layer 57. The host substrate layer 57 is typically composed of crystalline or polycrystalline semi-insulating material, such as intrinsic silicon or lightly doped (p or n type) silicon. Each strain gage 55 may be formed in accordance with the teachings of commonly assigned U.S. Pat. No. 6,635,910, entitled SILICON STRAIN GAGE HAVING A THIN LAYER OF HIGHLY CONDUCTIVE SILICON, issued Oct. 21, 2003, the entire disclosure of which is hereby incorporated by reference as if being set forth in its entirety herein. Other strain gages may alternatively be used such as a silicon die with four strain gages junction isolated or dielectrically isolated (SOI).

As is further understood by one of ordinary skill in the art, and with regard to FIG. 1C, port 20 and diaphragm 30 may be composed of any suitable material, such as a metal like stainless steel. Furthermore, diaphragm 30 may be thinned using conventional methodology, such as machining to form thinned region 40. Diaphragm 30 may be affixed to port 20 in a conventional fashion, such as via welding.

In operation, when pressure is applied to an open end 22 of port 20, the thinned region 40 of diaphragm 30 deflects in response thereto. Two gages (e.g. 51, 54) are put into compression and two gages (e.g. 52, 53) are put into tension (see e.g. FIGS. 1F-1G) when the thinned region 40 of diaphragm 30 deflects. The resulting output taken across certain of the nodes is representative of the resultant pressure as is understood by one of ordinary skill in the arts.

The aforementioned methodology for manufacturing such transducers according to the prior art, however, is limited due to processing inefficiencies, dirt and debris, and control problems, for example.

Figure 2A:
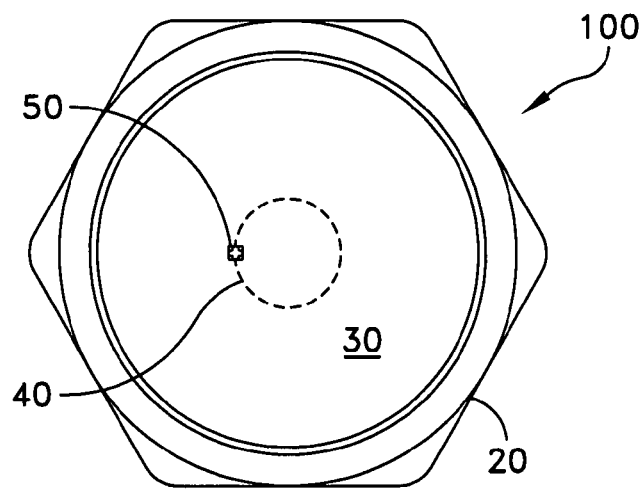
FIG. 2A illustrates a schematic top view of an integrated full bridge strain gage pressure transducer according to an embodiment of the present invention.
Figure 2B:
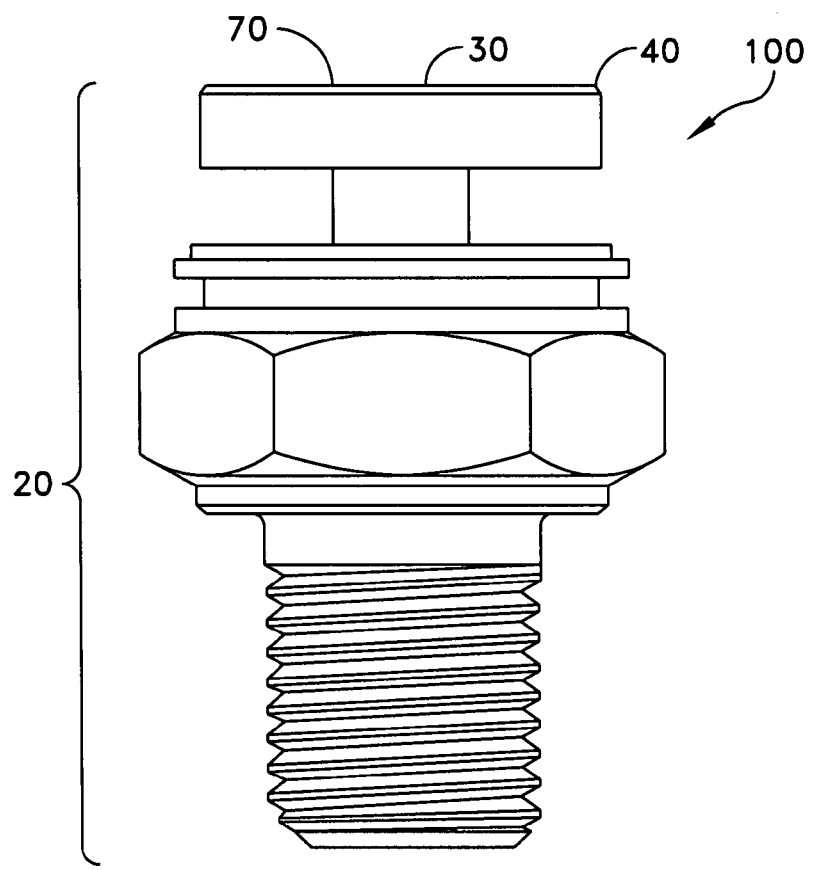
FIG. 2B illustrates a second view of the pressure transducer of FIG. 2A.
Figure 2C:
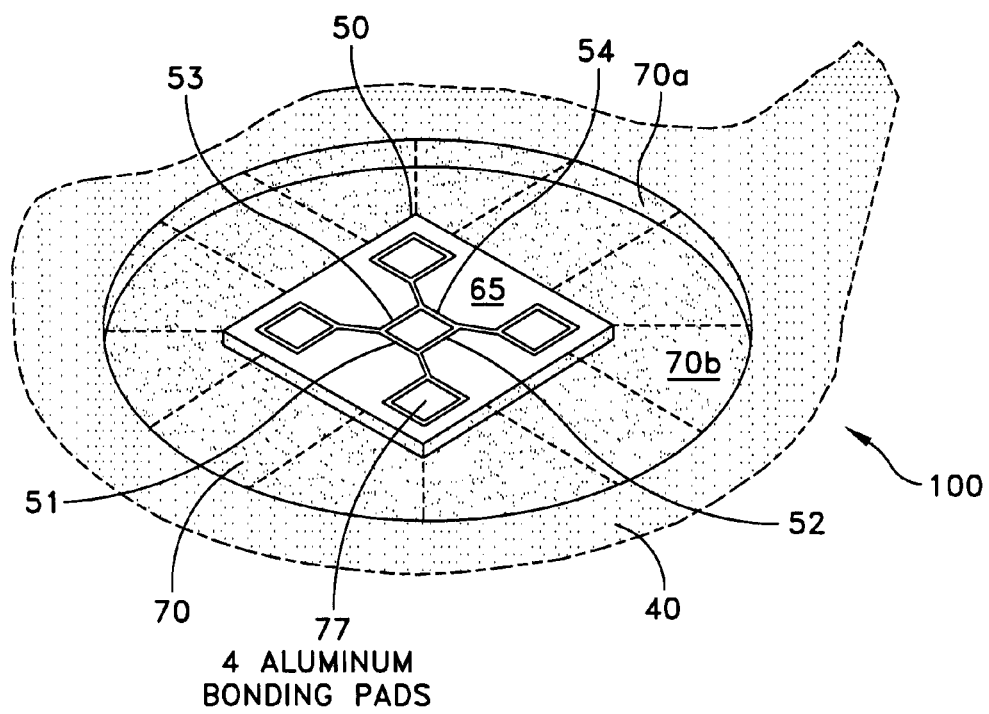
FIG. 2C illustrates a perspective view of a portion of the pressure transducer of FIGS. 2A and 2B formed according to an embodiment of the present invention.
Figure 2D:
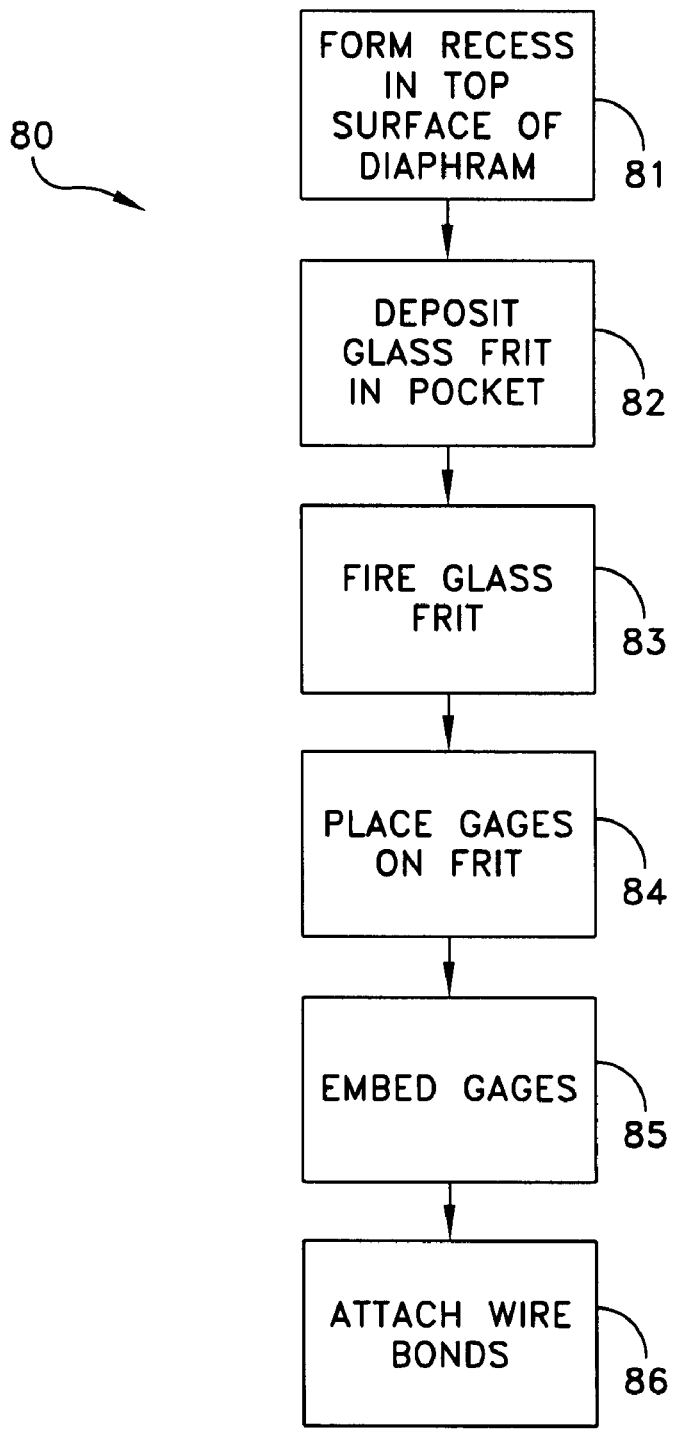
FIG. 2D illustrates a flow diagram of a process suitable for making the pressure transducer of FIGS. 2A, 2B and 2C according to an embodiment of the present invention.

Referring now FIGS. 2A, 2B and 2C in conjunction with the process flow diagram of FIG. 2D, there is provided a pressure transducer 100 and method of forming the pressure transducer according to an embodiment of the present invention. FIG. 2C shows a perspective view of a portion of transducer 100 according to an embodiment of the present invention and formed in accordance with the operations depicted in FIG. 2D, wherein diaphragm 30 includes a recess 70 formed therein. The recess may be formed by machining the diaphragm top surface to form circumferential side walls 70a extending from uniform floor surface 70b of sufficient size to receive and surround the glass frit. That is, recess 70 is adapted so as to contain and confine the glass frit 75 within the recess, thereby providing enhanced uniformity of thickness of the frit layer. Such configuration avoids the prior art drawbacks associated with puddling, non-uniform glass thickness and concomitant breakdown voltage control problems associated with the prior art method and apparatus of FIG. 1H.

In a preferred embodiment, the strain gages (e.g. gages 51-54) are embedded in the glass frit in a full Wheatstone bridge configuration. In an exemplary embodiment, recess 70 may be on the order of about 0.001" (inches) to 0.002" deep, and about 0.04" to 0.05" wide, for example. While a substantially circular recess 70 is shown in the illustrated embodiment of FIG. 2D, other shaped recesses may be used for accommodating the silicon die, frit and strain gage configurations.

Referring now to FIG. 2D in conjunction with FIGS. 2A-2C, there is shown a flow diagram of a process 80 suitable for forming transducer 100 according to an embodiment of the present invention. At block 81, recess 70 (FIG. 2D) is formed in the top surface of diaphragm 30. Recess 70 may be formed in any conventional manner, such as by machining, or electrical discharge machining at the same time as when the port 20 (FIG. 2B) is machined, for example. After machining the port including forming the recess 70, the device is cleaned using a solvent, for example. At block 82, glass frit 75 (FIG. 2D) is deposited into recess 70 using a constant volume paste dispenser such as commonly used in the fabrication of surface mount printed circuit boards. The process as described herein is not a screen print function but rather a depositing function using a dispenser to provide a more uniform thickness glass frit layer. By controlling the uniformity of the glass thickness, the breakdown voltage is controlled and a much higher breakdown voltage is achieved in the transducer using the present process in contrast to prior art production methods. For example, transducers formed in accordance with the method depicted in FIG. 2D and sized according to the parameters indicated herein may experience a breakdown voltage of 1000 volts (v) whereas a similar sized transducer manufactured according to the prior art has a breakdown voltage of only about 250 v.

Still referring to FIG. 2D, at block 83, the entire port (including the glass frit 75) is fired at about 550 degrees Celsius (C.) for a specified period of time, typically in a tube furnace. At block 84, an integrated full Wheatstone bridge of four strain gages integral to a silicon die 65 (see FIG. 2C) is placed on top of the fired frit 75. At block 85, the composite frit and integrated gages is fired to embed the gage into the frit at 500 degrees C. in a tube furnace. At block 86, wire bonds (e.g., 51C, 52C, 53C, 54C, as shown in FIG. 2C) are then attached to an interface, such as an amplifier or ASIC.

Recess 70 serves to hold the glass frit 75 prior to firing, such that bead blasting is not necessary. Accordingly, there is no bead blasting residue that needs to be removed. Recess 70 may also serve to better prevent glass frit runoff than prior art techniques of roughening the diaphragm surface. Recess 70 may thus allow for a 10-20% lesser amount of glass frit material to be used than employed in techniques that roughen the surface. Further, recess 70 may allow for a more accurate positioning of glass frit 75 and gages 50, than that of a roughened surface does.

Transducer 100 shown in FIG. 2B including the recess 70 for receiving glass frit 75 incorporates a silicon die with four junction isolated strain gages bonded to a thinned region 40 of a diaphragm 30, associated with pressure port 20. As in understood by one of ordinary skill in the art, bonding pads 77 such as aluminum bonding pads provide electrical connectivity to the die. Port 20 and diaphragm 30 may be composed of any suitable material, such as a metal (e.g. stainless steel). Port 20 may be on the order of 0.50" to 0.75" wide and about 0.50" to 1.0" high. Diaphragm 30 may be on the order of 0.007" to 0.040" thick and about 0.15" to 0.75" wide. The thickness of glass frit 75 may be about 0.003" thick after firing. Port 20 and diaphragm 30 may be composed of any suitable material, such as a metal like stainless steel. Furthermore, diaphragm 30 may be thinned using conventional methodology, such as machining to form thinned region 40. Diaphragm 30 may be affixed to port 20 in a conventional fashion, such as via welding.

It will be apparent to those skilled in the art that modifications and variations may be made in the apparatus and process of the present invention without departing from the spirit or scope of the invention. It is intended that the present invention cover the modification and variations of this invention provided they come within the scope of the appended claims and their equivalents.

What is claimed is:

1. A method for making a pressure transducer comprising:
    forming a recess in a diaphragm, the diaphragm having a thinned region that deflects responsively to pressure being applied thereto;
    depositing a glass frit in the recess;
    embedding a plurality of strain gages in the glass frit; and,
    wire bonding the strain gages into a Wheatstone bridge configuration.

2. The method of claim 1, wherein the forming comprising machining.

3. The method of claim 1, further comprising firing the glass frit after depositing and prior to embedding.

4. The method of claim 1, wherein the embedding comprises:
    placing the plurality of strain gages on the glass frit; and,
    firing the glass frit and strain gages.

5. The method of claim 1, further comprising securing the diaphragm to a port.

6. The method of claim 1, wherein the Wheatstone bridge configuration is a full bridge configuration.

7. The method of claim 1, wherein the step of depositing glass frit comprises dispensing said glass frit into said recess using a paste dispenser.

8. The method of claim 7, wherein said paste dispenser is a constant volume paste dispenser to provide a uniform thickness glass frit layer.

9. The method of claim 1, wherein said strain gages are on a silicon die.

10. A pressure transducer comprising:
    a diaphragm having a thinned region;
    a recess in the diaphragm;
    a glass frit in the recess; and,
    a plurality of strain gages in the glass frit;
    wherein, when a pressure is applied to the diaphragm, the thinned region deflects, and the resistance of the strain gages change responsively thereto.

11. The pressure transducer of claim 10, further comprising a port coupled to the diaphragm.

12. The pressure transducer of claim 10, wherein the diaphragm is metal.

13. The pressure transducer of claim 10, wherein the strain gages are coupled in a Wheatstone bridge configuration.

14. The pressure transducer of claim 13, wherein the Wheatstone bridge configuration is a full bridge configuration.

15. The pressure transducer of claim 10, wherein the recess is smaller than the thinned region.

16. The pressure transducer of claim 15, wherein the recess is in the thinned region.

17. The pressure transducer of claim 10, wherein the strain gages are serpentine semiconductor strain gages.

18. The pressure transducer of claim 10, further comprising wire bonds coupled to each of the strain gages.

* * * * *